(12) United States Patent
Mietta et al.

(10) Patent No.: US 8,685,198 B2
(45) Date of Patent: Apr. 1, 2014

(54) TEXTILE LAMINAR STRUCTURE FOR MAKING ACOUSTIC COMPONENTS

(75) Inventors: Marco Mietta, Appiano Gentile (IT); Paolo Canonico, Appiano Gentile (IT)

(73) Assignee: Saati S.p.A., Appiano Gentile (CO) (IT)

( * ) Notice: Subject to any disclaimer, the term of this patent is extended or adjusted under 35 U.S.C. 154(b) by 0 days.

(21) Appl. No.: 13/642,468

(22) PCT Filed: Apr. 20, 2011

(86) PCT No.: PCT/IB2011/000862
§ 371 (c)(1), (2), (4) Date: Oct. 19, 2012

(87) PCT Pub. No.: WO2011/132062
PCT Pub. Date: Oct. 27, 2011

(65) Prior Publication Data
US 2013/0032285 A1   Feb. 7, 2013

(30) Foreign Application Priority Data

Apr. 21, 2010   (IT) .............................. MI2010A0685

(51) Int. Cl.
*B29C 65/02*   (2006.01)
(52) U.S. Cl.
USPC ................. 156/291; 156/308.2; 442/286

(58) Field of Classification Search
USPC .......... 156/308.2, 331.7, 295, 311, 321, 290, 156/291; 442/286, 287, 288, 289, 290, 292, 442/293
See application file for complete search history.

(56) References Cited

U.S. PATENT DOCUMENTS 5,828,012 A * 10/1998 Repolle et al. ................ 181/175

FOREIGN PATENT DOCUMENTS

| EP | 0481156 A1 | 4/1992 |
|---|---|---|
| EP | 0862870 A2 | 9/1998 |
| GB | 1318823 A | 5/1973 |
| WO | 2007067949 A2 | 6/2007 |

OTHER PUBLICATIONS

International Search Report Jun. 29, 2011.

* cited by examiner

*Primary Examiner* — Katarzyna Wyrozebski Lee
*Assistant Examiner* — Vishal I Patel
(74) *Attorney, Agent, or Firm* — Hedman & Costigan, P.C.; James V. Costigan; Kathleen A. Costigan

(57) ABSTRACT

A laminar textile construction, to be used in acoustic components, characterized in that said construction comprises a double layer arrangement made by coupling a technical synthetic single-thread fabric material to a polymeric film, for use as sub-component elements in acoustic and electronic products in general.

7 Claims, 9 Drawing Sheets

TEXTILE LAMINAR STRUCTURE FOR MAKING ACOUSTIC COMPONENTS

BACKGROUND OF THE INVENTION

The present invention relates to a laminar textile construction material, particularly suitable for acoustical components.

The textile construction according to the present invention may be used in all electronic devices, made either in a small or large series, including at least an audio function, such as a sound emission, either of a vocal or musical type, by loudspeakers or similar devices, or a sound reception by microphones of any desired types.

To the above mentioned broad electronic apparatus group pertain several products, such as the following most common devices: land and cellular phones, free hand devices and other fittings, Skype and SAT phones, walkie-talkies, audio devices built-in in helmets and the like, professional radio apparatus for military, safety and civil protection applications and outdoors works; hand-held Hi-Fi systems, such as MP3 read-out devices, earpieces, headphones, hand-held acoustical boxes, professional audio devices such as microphone and headphones, loudspeaker components; TVs, monitors, hand-held DVD players and the like; satellitar navigators including vocal signaling capabilities; car Hi-Fi systems, vocal warning systems; indoor communication devices for trains, airplanes, ships; loudspeakers for computers and audio fittings in general; domestic application fittings such as entryphones, indoors audio communication devices; acoustic devices for hard of hearing people and other sanitary apparatus.

As further known, in a number of hand-held systems, such as cellular phones or walkie-talkies, these devices are also designed, in most cases, for outdoors applications, and not only for closed environment uses.

Thus, for these devices, and for all products to be used outdoors, a protection from atmospheric agents is a very important issue.

In particular, such a protection would be necessary on inner acoustic components, such as loudspeakers and microphones.

In fact, the above components are very delicate ones, and must be protected from intrusion of water and solid particles such as powder, dirt, dangerous debris, without causing the sound emitting or receiving characteristics, as originally designed, to drop.

Thus, the functional requirements for the above mentioned acoustic components are rather complex, since they must combine good sound transmission characteristics, to be achieved by large openings formed through the device outer shell, with a satisfactory protection of the device component, which protection would require to insulate as far as possible the acoustic component from the outside environment.

The most commonly used protective system provides to apply porous protection arrangements on the outer openings or ports, which, in a typical cellular phone, are usually three and are arranged through the main loudspeaker, microphone and free hand used/ringtone speaker.

For protecting the above mentioned acoustic components, different approaches are conventionally used, depending on the application requirements and protection degree to be achieved.

In some rare cases, no component protection is used, whereas, in other cases, protecting bars or grids, molded of a plastics material, with an exclusively anti-impact function are used.

Another protective system comprises large mesh protective nets, such as protective metal nets, microphone bulb protecting net arrangements, or plastics material molded grids.

The above protective arrangements also having a protective function against a possible intrusion of small articles, such as pencils and the like.

Yet another protective system comprises a screen made of a non-woven fabric material, with an optional water repellent treatment, arranged in the front of the acoustical component.

Said protective screen may also be made of a technical synthetic single-thread fabric material, processed by an optional water repellent treatment.

Yet another protective system comprises a water repellent expanded PTFE or E-PTFE membrane.

The above disclosed three approaches, however, are not adapted to provide a protection from liquids, but only a limited protecting efficiency against solid articles having from middle to large dimensions, while the other above mentioned protective arrangements assure a good protection even against a possible intrusion into the acoustical component of liquids and powders.

The latter protective arrangements conventionally comprise textile components, usually of a synthetic type, in the form of fabrics, non-woven fabrics or membrane materials.

For an easy assembly to protect the acoustical components, the textile material must have a suitable form or shape; in this respect, different assembling solutions would be possible, depending on the configuration and size of the end product.

In most common cases, such as in cellular phones, the protective textile material screens are assembled together with gasket elements made of synthetic foamed materials and bi-adhesive tape templates, assuring a full adhesion of the protective screen to the outer body of the device being protected.

The above components are usually made of a technical polyester single-thread fabric material, and comprise an annular gasket element provided with an adhesive area to be glued on the cellular phone shell.

From an acoustical standpoint, the protective screen, as provided, must not alter the inlet and outlet sound flow, with respect to the designed parameters.

Usually, for a main part of large consume acoustic products, it is necessary to minimize the sound pressure level attenuation or dropout.

Thus, the protective screen must be an acoustically transparent one, and should provide its protective function while interfering as less as possible with the acoustic component inlet or outlet sound flow, which event is very common for cellular phones, in which the protective screen does not excessively attenuate the cellular phone loudspeaker sound or microphone sensitivity, to allow small, light and inexpensive acoustic members to be used.

In other cases, frequently related to from middle to high range acoustic products, the protective screen should provide a true acoustic function, so as to level possible emission peaks or distorted sounds, to differently balance the frequency response of the acoustic component.

Such a feature would be a particularly interesting one for low frequencies, which are rather critical in small loudspeakers, and which may be amplified by introducing a textile material section on the back portion of the loudspeaker, as it occurs in some earpieces.

In all cases it can be said that the textile material component, made of a fabric, non-woven fabric or membrane material, must preserve the originally designed acoustical characteristics precise which, depending on the target application, may vary from a maximum acoustic transparency to a set sound attenuation level.

To precisely define and set the above acoustic characteristics, several systems and methods may be used.

One of said systems comprises a measurement of a specific resistance to the passage of air (ASTM C522-87), relating the flow rate to the load loss for a stationary air flow passing through the textile product.

The results are expressed in Rayls MKS and to low values of this parameter will correspond, as well known, acoustically transparent materials.

Another system provides to perform a measurement of an acoustic impedance value, based on the same above parameters, but measured for an air flow alternating regimen, that is under conditions more adherent to the acoustic application actual properties.

According to yet another system, it is possible to directly test the acoustical screen in an as constructed configuration thereof, that is with a shape and size identical to the assembled commercial product shape and size, thereby performing a direct measurement of the sound pressure level, either with or without a textile screen arranged between the sound source and measurement microphone.

The test result is usually expressed in decibels, dB (SPL), and depends on different standardized measurement methods (ISO/FDIS 7235:2003 or the like).

The latter measurement system is the most interesting one and has been used for testing acoustic components having a size similar to that of the most critical cellular phone components, that is disc elements of a diameter of 3-5 mm built-in in the phone microphones.

Loudspeakers, on the other hand, require less acoustically critical double or triple dimensions.

Owing to a specifically designed configuration of the test sample and holder therefore, very similar to a real application, samples of the above mentioned type have been subjected to direct acoustical measurements, with the following results:

A reduction to about −1.5 dB (SPL) would be normally acceptable in the phone field and would correspond to components with a limited acoustical attenuation, or even "acoustically transparent" components.

Higher losses, of a value up to −15 dB (SPL), would be yet acceptable if a perfect sound would not be required and if it would be possible to offset the performance balance in favour of protective properties, (to the detriment of a perfect acoustic performance), such as, for example, in heavy duty walkie-talkie devices, waterproof cellular phones, military radio sets, and other applications in which it is necessary to transfer a simple vocal and not a true musical signal.

The International Standard IEC60529 defines the "Ingress Protection" index with reference to some much or less hard test conditions, in which the electronic component shell is subjected to an intrusion of either solid articles or water.

The first digit of the above IP index is related to the solid material intrusion resistance. Index levels from IP1X to IP4X would be usually of low interest for acoustic components which, on the contrary, nearly always require an IP5X level, assuring a partial protection against a powder intrusion.

An IP6X level requirement, related to a perfectly sealed or tight component, is, on the contrary, less common.

The second digit of the above IP index is related to the water resistance.

Thus the IPX3, IPX4 and IPX5 levels are related to different intensity water sprays.

Usually, for the most common products or articles, such as cellular phones, a IPX3 level would be just sufficient.

On the contrary, the "heavy duty" acoustic product market requires a protection level up to IPX7, corresponding to an immersion into a water pool to a depth of 1 meter for 30 minutes.

It should be apparent that the above are very stringent conditions, which, at present, are met only by a textile material, that is the E-PTFE water-repellant membrane.

However, protective screens made of a technical fabric material have improved performances with respect to the protection of acoustic components from water and solid particles.

To better understand the above, it is possible to resume the provided observations into only two classes, therein are included the most part of protective screen including acoustic devices: the IP53 (or IP54) and IP67 level.

More specifically, the IP53 (or IP54) level is required in a most part of cellular phones and handheld audio devices.

In fact, in addition to a sufficient powder protection, the above products require a satisfactory protection from rain water and other liquid spray intrusion.

Protection levels up to IP54, related to middle pressure water jets, are generally considered as sufficient in the cellular phone market, in which a valid protection from rain and water sprays is desired, but in which an impermeable product capable of resisting to immersion to a set depth into water is not truly required.

The IP67 level, more stringent than the preceding one, provides that the product is adapted to resist to a water immersion up to a depth of 1 meter for 30 minutes.

It should be apparent that the above requirements must be met only for very is stringent heavy duty applications, such as military radio sets, walkie-talkies used in outdoor yards and work areas, police and safety communication devices, sea applications and the like.

As above disclosed, the main part of consume acoustical products, such as cellular phones, generally require an IP53 or IP54 protection level.

However, to the above it should be further added that, even for the latter products, a recent designing trend is to provide a higher protection level, up to IP67, to allow these devices to be perfectly protected from accidental water intrusions.

Accordingly, at present, a protecting IP67 index level is used even for products which previously did not require it.

Thus, the textile components for protecting acoustic members or components will be further correspondingly improved in a near future.

Moreover, as above disclosed, at present three different technical solutions are adopted, based on different textile products, adapted to provide the acoustical and protection performance required by modern acoustic products, that is the non-woven fabric materials, the synthetic single thread technical fabric materials and water repellent E-PTFE membranes.

The multi-thread fabric materials, because of their uneven nature, are rarely used and have characteristics similar to those of the non-woven fabric material.

Between the above mentioned textile products, said non-woven fabric materials have a less acoustic applications performance.

They generally provide a protection level corresponding to IP53 or IP54, but are not suitable to resist against long duration water immersions.

The water intrusion pressure values vary from 15 to 30 cm water column (1500-3000 Pa), and are not sufficient to provide an IP67 protection level.

From an acoustical standpoint, the above materials cannot be considered as perfectly suitable or valid.

In fact, they may achieve acoustical impedance values corresponding to 50-60 Rayls MKS, but may not descend under such a limit, thereby they are not a perfectly transparent acoustical filter.

Specifically designed tests, carried out on components similar to that used in a real application (cellular phones) have demonstrated that this type of material shows a sound pressure level reduction of the order of 3-5 dB(SL), which value is not a low value and moreover it is not easily repeatable.

In actual practice, in the acoustical field, non-woven fabric materials do not represent the best choice, since they are outclassed both by the single thread fabrics (with respect to the acoustical characteristic) and by the membranes (with respect to the water repellent properties).

The technical synthetic single thread fabrics, in turn, have an open square mesh construction allowing to minimize the air passage resistance.

They provide an optimum acoustical performance: their acoustical impedance usually varies in a range from 5 to 300 MKS Rayls, and may also arrive at 2000 Rayls for some special products, and the sound pressure level reduction is in a range of 0.1-2.0 dB (SPL), which is absolutely the best performance of all the textile components used in acoustical products.

FIG. 8 shows a frequency response of a fabric material having an acoustical impedance of 90 MKS Rayls, which corresponds to about a middle point of the above disclosed range, and showing an average or middle sound pressure level loss of 0.7 decibels, in a typical cellular phone application.

On the contrary, because of their comparatively high free surface rate, the open mesh fabrics are not suitable to provide optimum water repellent characteristics.

Normally, the components made of these fabrics provide a protecting index corresponding to IP53 or IP54 and, in this respect, are rather similar to non-woven fabric materials (with a resistance up to 20 cm of water column).

Such a protection level, on the other hand, is suitable for a very large number of applications, such as a lot of cellular phone field products, but does not meet the protection requirements of the above mentioned heavy duty applications.

Accordingly, the present development target of the single thread acoustical fabrics is that of achieving an improved or greater protection index, up to IP67 or IP68, in order to correspondingly increase possible practical application ranges, including even those having most stringent requirements with respect to the water resistance standpoint.

The E-PTFE impermeable membranes, also used in the acoustical field, provide an optimum protection against liquid intrusion.

Intrusion pressure values near to or greater than 10 meters of water column (=1 bar) allow the E-PTFE membranes to achieve protection levels corresponding to at least IP67, or even to IP68, thereby providing these materials with optimum water repellent properties.

On the contrary, the acoustical performance of said E-PTFE membranes is not optimum.

In fact, they conduct sounds mainly by a vibration effect, involving a comparatively high reduction of the sound pressure level, usually near to −10 dB (SPL) for a typical size of acoustic components.

A further drawback of the above mentioned membrane is their extremely variable frequency response.

As shown in FIG. 9 diagram, a typical membrane may loss about 10 dB at low frequencies and only 1-2 dB at higher frequencies: accordingly, the transmitted sound quality is partially deteriorated.

To conclude, among the above mentioned three textile products conventionally used in the acoustical field, the E-PTFE membranes are those having a lower acoustic performance.

On the other hand, it should be pointed out that in heavy duty acoustic applications, it is usually necessary to transmit human voice only and not music: accordingly, a non optimum sound quality may be tolerated.

However, this is a gap or defect of currently available products, thereby it would be desirable to provide an improved product at least assuring a more constant or flat frequency response and a more predictable performance, while preserving the required impermeable characteristics.

Finally, to the above it should be further added that the mentioned E-PTFE membranes also have the following defects:

a small mechanical strength and a high damage sensitivity;

a difficult die-cut and assembling process since the cold cutting operation does not provide an optimum quality, and is necessary a great industrial process set-up with consequent problems in inlet strip splicings;

a high elasticity, negatively affecting a proper coupling with other materials and providing variable stresses in the finished article, with a poor repeatability of the acoustic characteristics;

non perfectly constant dimensional parameters, particularly the membrane thickness;

an impossibility of making from middle to large dimension or size components;

the requirement of adding a protective film to the membrane half-processed product, with an additional expense;

the requirement of using much more expensive adhesive materials, specifically designed for PTFE.

Thus, none of the above mentioned currently used materials allows to fully meet the market requirements, in particular if an IP67 protection index is required.

Thus, it would be desirable to provide a novel product for the above mentioned applications which has impermeable properties as good as those of the membranes, while allowing to overcome all the defects of the latter, with respect to the acoustic lack of coherence, and to their poor mechanical characteristics.

SUMMARY OF THE INVENTION

Accordingly, the aim of the present invention is to provide a novel product, having water repellent characteristics at an IP67 level, but based on a single-thread fabric material and not on E-PTFE membranes, thereby overcoming all the practical problems of the latter.

Within the scope of the above mentioned aim, a main object of the invention is to provide such a product for the above mentioned acoustic applications, which is impermeable, resistant and insensible to packaging and assembling stress thereon.

Another object of the invention is to provide such a product which has, moreover, more predictable acoustical characteristics, with a flat and repeatable frequency response.

According to one aspect of the present invention, the above mentioned aim and objects, as well as yet other objects, which will become more apparent hereinafter, are achieved by a laminar textile construction, particularly for acoustic components, characterized in that said textile construction comprises a double layer arrangement, made by coupling a technical synthetic single-thread fabric material with a polymeric film, for use as sub-components in acoustic and electronic products in general.

BRIEF DESCRIPTION OF THE DRAWINGS

Further characteristics and advantages of the present invention will become more apparent hereinafter from the following detailed disclosure of a preferred, though not exclusive, embodiment of the invention, which is illustrated, by way of an indicative, but not limitative, example in the accompanying drawings, where.

DESCRIPTION OF THE PREFERRED EMBODIMENTS

With reference to the number references of the above mentioned figures, the laminar textile construction according to the present invention, which has been generally indicated by the reference number 1, comprises a double layer arrangement, made by coupling or laminating a technical synthetic single thread square mesh fabric to a polymeric film of minimum thickness, preferably from 2 to 10 microns, by a hot-melt laminating or the like method.

The inclusion of a laminated continuous thin film together with the fabric material allows to achieve an outer surface free of openings, therethrough water may enter only under very high pressures, near to or larger than 1 bar, which pressures are much greater than the minimum pressure threshold provided by the protection index IP67.

Said additional film, as stated, is very thin and adapted to autonomously vibrate as a sound flow passes therethrough.

Accordingly, a comparatively good sound level conduction is assured both at the inlet and at the outlet, which would be acceptable for a number of acoustical products, and in particular for communication devices to be used in heavy duty applications.

From an acoustical measurement standpoint, the construction according to the present invention provides a reduction of the sound pressure of −10 dB (SPL), as an average value, with a very flat frequency response through the overall range from 300 to 4000 Hz, which is the typical reference frequency range for vocal communication devices, such as cellular phones and radio sets.

Figure 10:
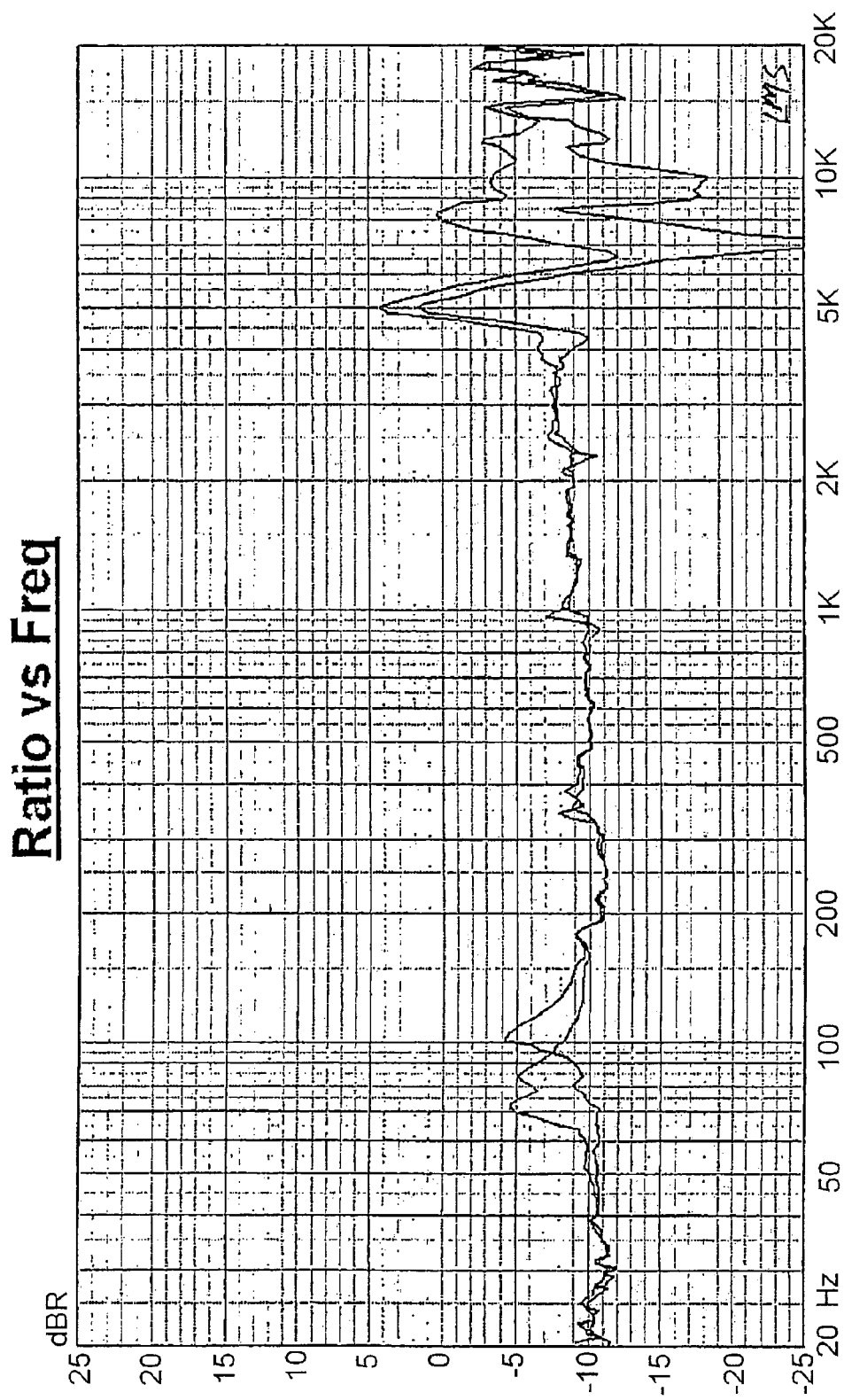
FIG. 10 is yet another diagram showing the reduction of the sound pressure level of the laminated fabric material construction according to the present invention.

FIG. 10 shows the frequency response of the inventive material as herein disclosed, with reference to an acoustic filter having an inner diameter of 4 mm, which is a typical dimension of a component used in a radio set or cellular phone.

In absolute terms, the sound pressure level reduction is similar to that which may be achieved from a simple E-PTFE membrane, which value would be per se sufficient for a number of applications.

In actual practice, the acoustic performance is improved with respect to that of the membrane, owing to its greater repeatability, as it should be apparent from a comparison of the curves related to different samples of the same product, as shown in FIGS. 7-10.

Figure 7:
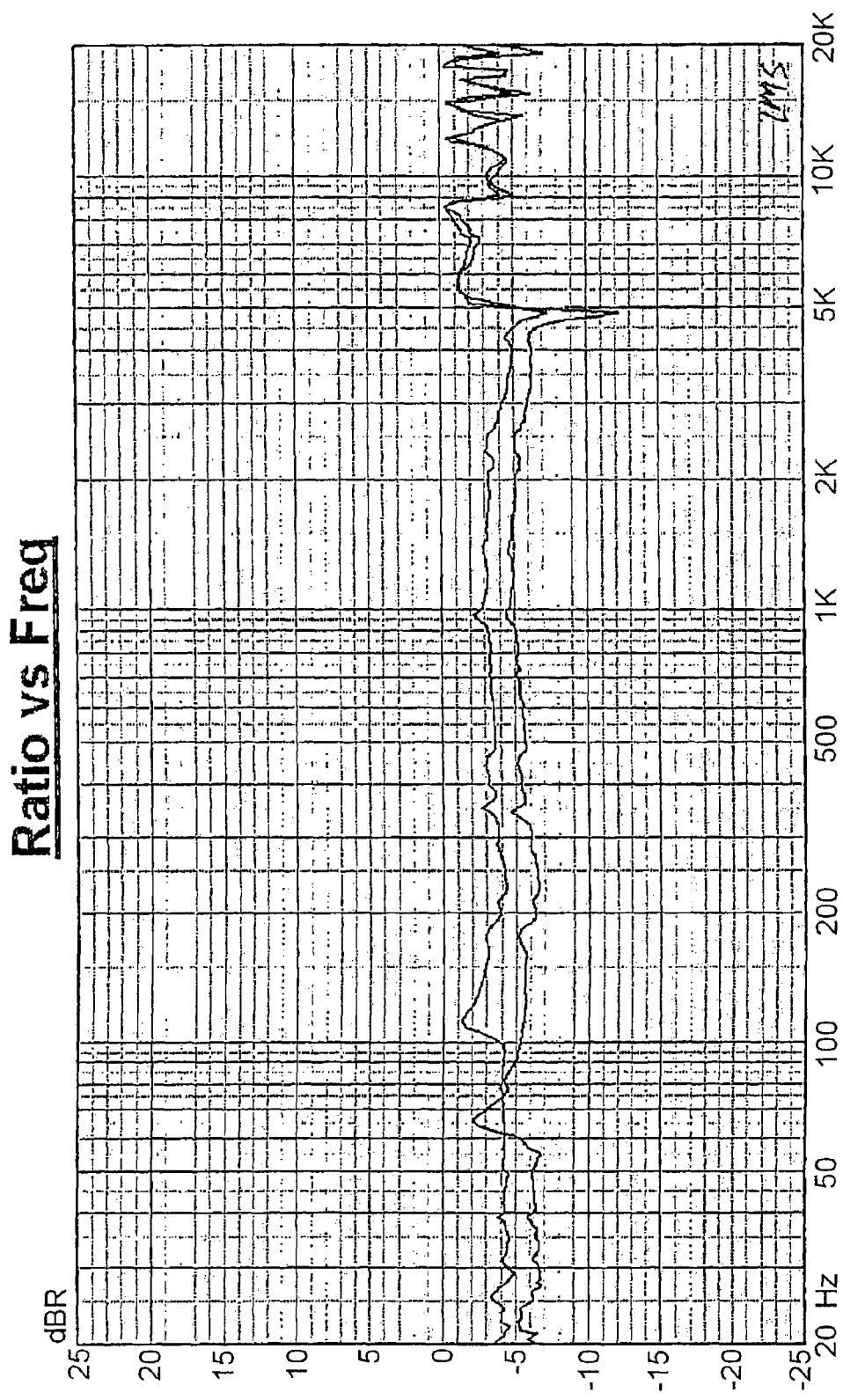
FIG. 7 is a diagram showing the reduction of the sound pressure level in a conventional or prior non-woven fabric material for acoustic use.

FIG. 7 shows the reduction of the sound pressure level of a conventional non-woven fabric material for acoustic use.

With a sample having a free area of a 4 mm diameter, mounted on the back of a circular opening of a 3 mm diameter, an average sound pressure level reduction of −0.5 dB (SPL), with a protection index IP54, has been achieved.

Figure 8:
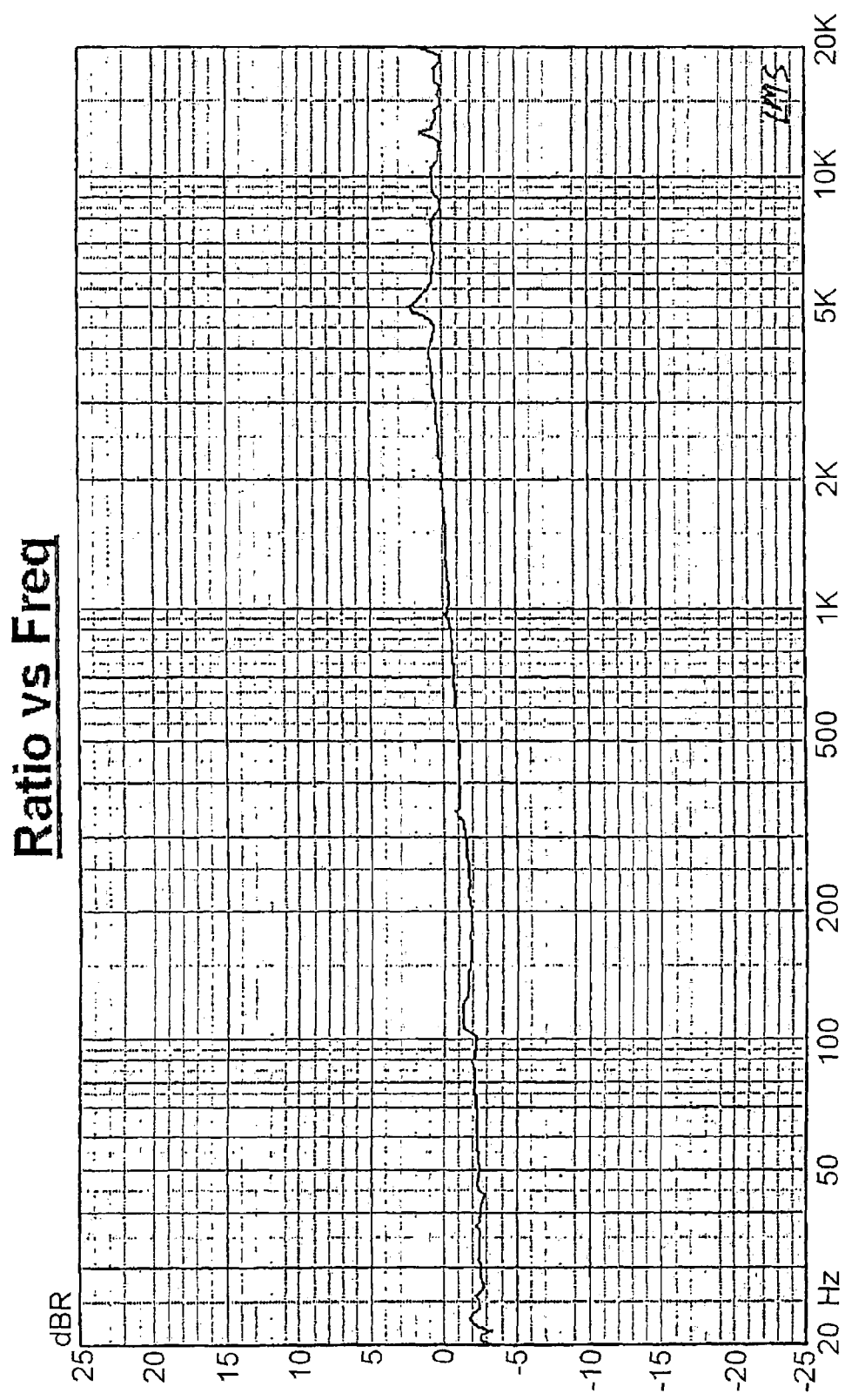
FIG. 8 is a diagram showing the sound pressure level reduction of a conventional acoustic synthetic single-thread fabric material.

FIG. 8 shows the sound pressure level reduction of a typical acoustic synthetic single-thread fabric material.

With a sample having a free area of a 4 mm diameter, assembled on the back of a circular opening of a 3 mm diameter, an average sound pressure level reduction of −0.7 dB (SPL), with a protection index IP54 or IP53, has been achieved.

Figure 9:
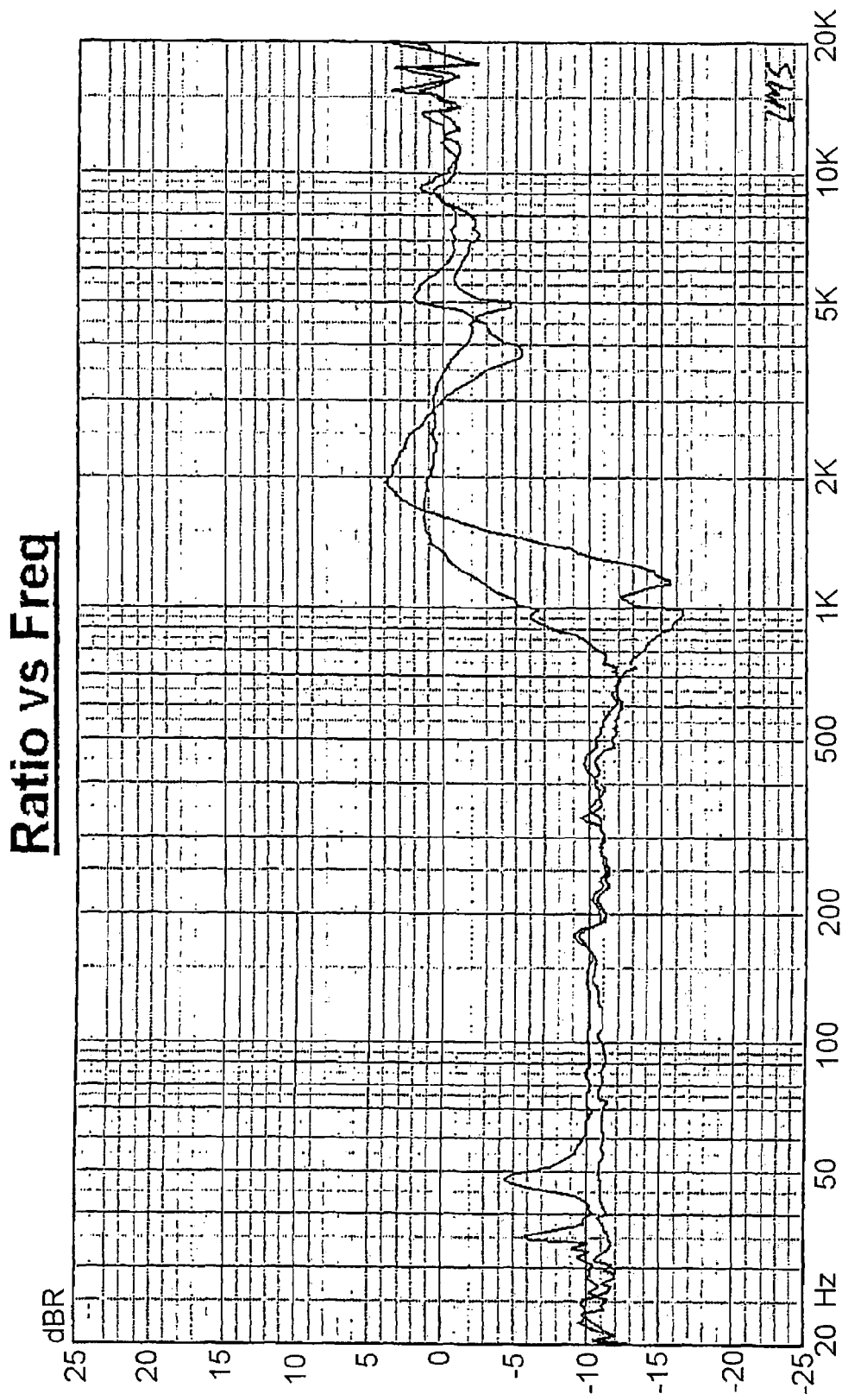
FIG. 9 is a further diagram showing the sound pressure level reduction in a conventional E-PTFE acoustic membrane.

FIG. 9 shows the reduction of the sound pressure level of a typical acoustic E-PTFE membrane.

With a sample having a free area of a 4 mm diameter, assembled on the back of a circular opening of a 3 mm diameter, an average sound pressure level reduction of −10 dB (SPL), for frequencies from 300 Hz to 1000 Hz, and −2 dB (SPL), for frequencies from 1000 Hz to 4000 Hz, with a protection index IP67, has been achieved.

FIG. 10 shows the sound pressure level reduction of the laminated material according to the present invention.

With a sample having a free area of a 4 mm diameter, assembled on the back of a circular opening of a 3 mm diameter, an average sound pressure level reduction of −10 dB (SPL), for all frequencies from 300 Hz to 4000 Hz, with a protection index IP67, has been achieved.

It should be apparent that the curve shape too is much more favourable in the construction according to the present invention: in fact, the reduction in decibels is nearly constant through the overall useful frequency range, differently from the membranes which would generate a rather distorted sound, since the different frequencies would be attenuated in a different degree, from −2 to −10 dB.

The protection level or index IP67, related to an immersion into water to a depth of 1 meter, is safely assured by the construction according to the present invention.

By way of an example, some practical embodiments of the laminar textile construction according to the present invention will be hereinafter disclosed.

According to an embodiment, the inventive construction comprises a bottom layer constituted by a technical polyester (PET) single-thread square mesh fabric, optionally of a black colour.

The construction is varied through the following exemplary ranges: thread diameter from 24 to 120 microns; number of threads/cm from 20 to 260; mesh opening from 20 to 250 microns; and for the exemplary embodiment shown in FIG. 10: 64 micron thread; 55 threads/cm, mesh opening 120 microns.

The top layer comprises a continuous PET, PEN, PEEK, PA6.6, PA6, PP, PBT, PE, PI, PEI film having a thickness variable, for example, from 2 to 10 microns.

The diagram of FIG. 10 is related to a 5 micron PEEK film associated with the above disclosed single-thread fabric material.

The coupling of the two surfaces is achieved by a hot-melt laminating method, by feeding molten PUR (reactive polyurethane) applied according to a suitable interspaced joining spot or point pattern, with an exemplary spot or point density from 30 to 100 per $cm^2$.

Since the inventive material is a textile product, it may be supplied in rolls of different heights, by way of an example from 80 to 220 cm, or it may be further machined to provide narrower strips, even of 15 mm only, or it may be die-cut according to any desired configuration.

With respect to the specific product made as above disclosed, with reference to a component having an inner diameter of 4 mm, which would be typical for cellular phones, the performance will be as follows:

textile material water intrusion pressure:
>10 meters water column;
finished filter water intrusion pressure:
>2.5 meters water column;
protection index: IP67;
average sound pressure level reduction:
−10 dB (SPL);
flat frequency response:
in the range of 300-4000 Hz.

The above characteristics, illustrated in the diagram of FIG. 10, show that the inventive construction has been improved with respect to the E-PTFE membrane from different standpoints, such as a constant and repeatable reduction of the sound pressure level, an undistorted sound, while holding that same protection index IP67 of the membranes and providing in addition improved mechanical and workability characteristics, which are much improved with respect to those of the E-PTFE membranes.

Figure 1:
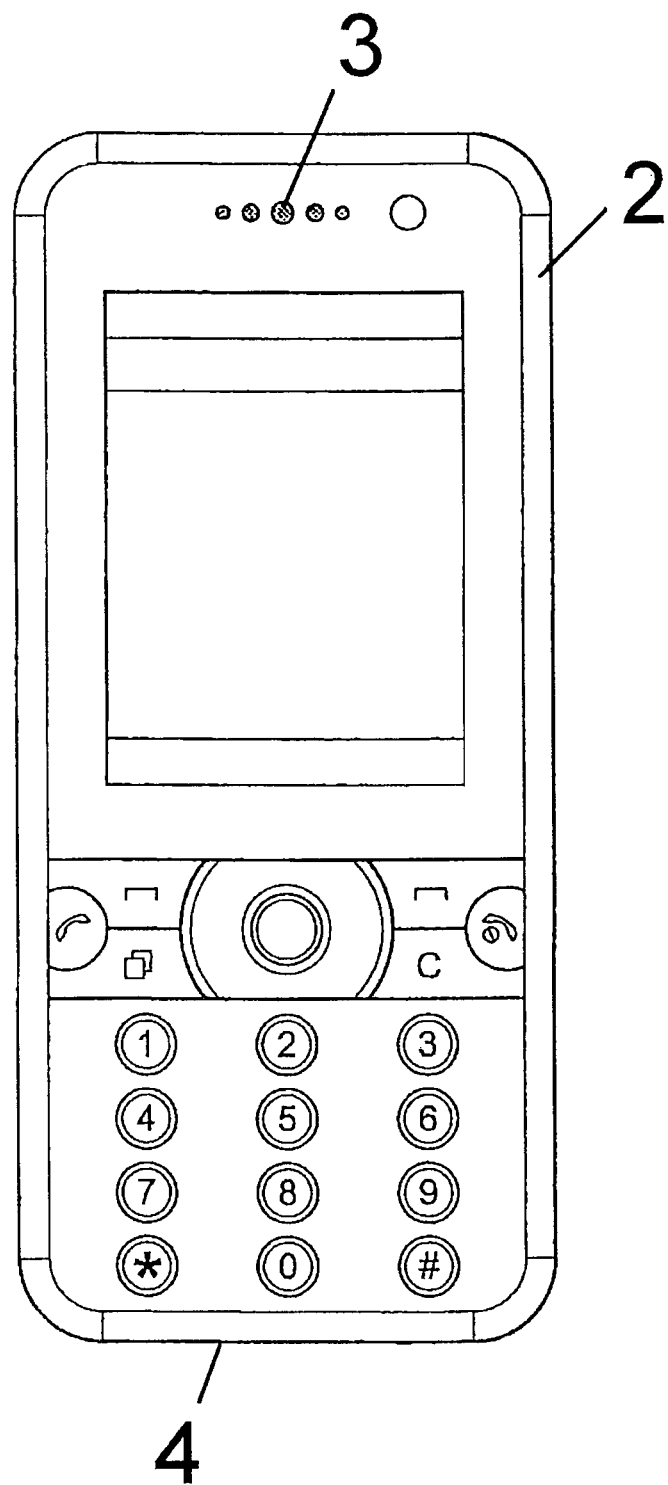
FIG. 1 shows a front portion of a cellular phone.
Figure 2:
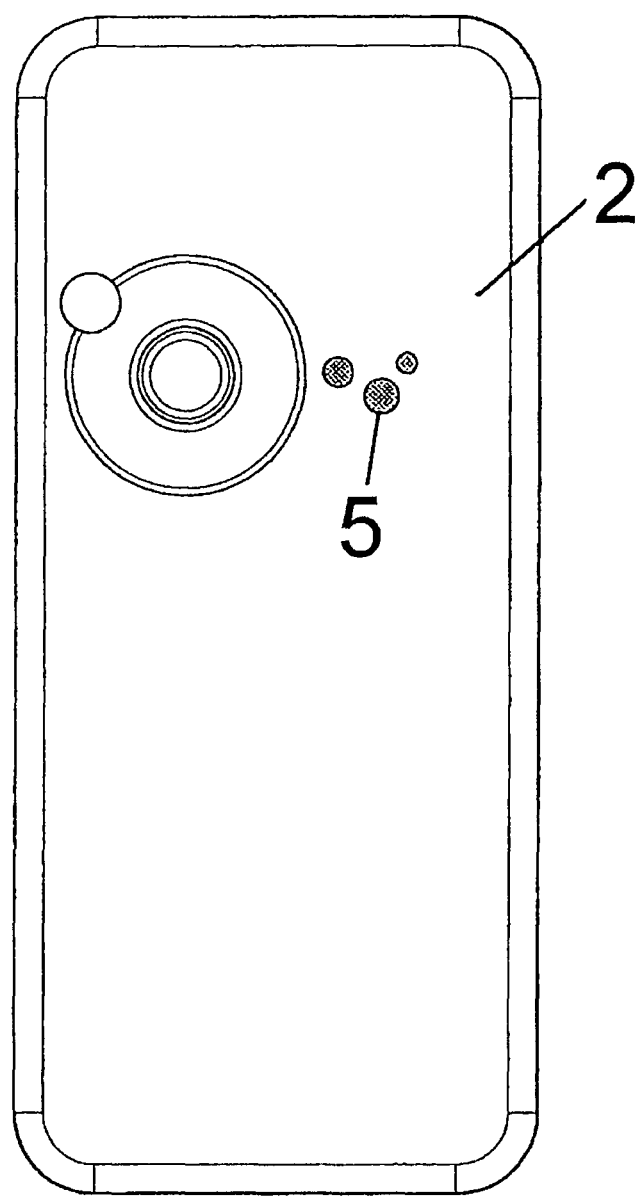
FIG. 2 shows the rear portion of a cellular phone.

FIGS. 1 and 2 show a typical cellular phone, generally indicated by the reference number 22, which conventionally comprises three outer openings, provided with dedicated protective arrangements: a main loudspeaker ("receiver") 3, a microphone 4 and a freehand application/ring tone loudspeaker 5.

Figure 3:
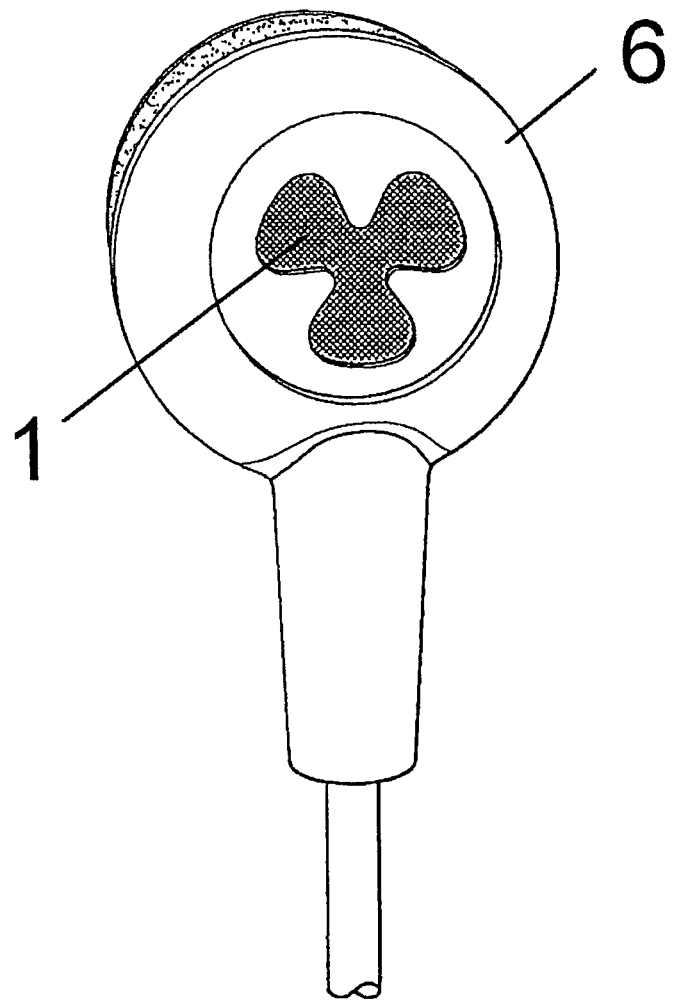
FIG. 3 is a perspective view of an earpiece.
Figure 4:
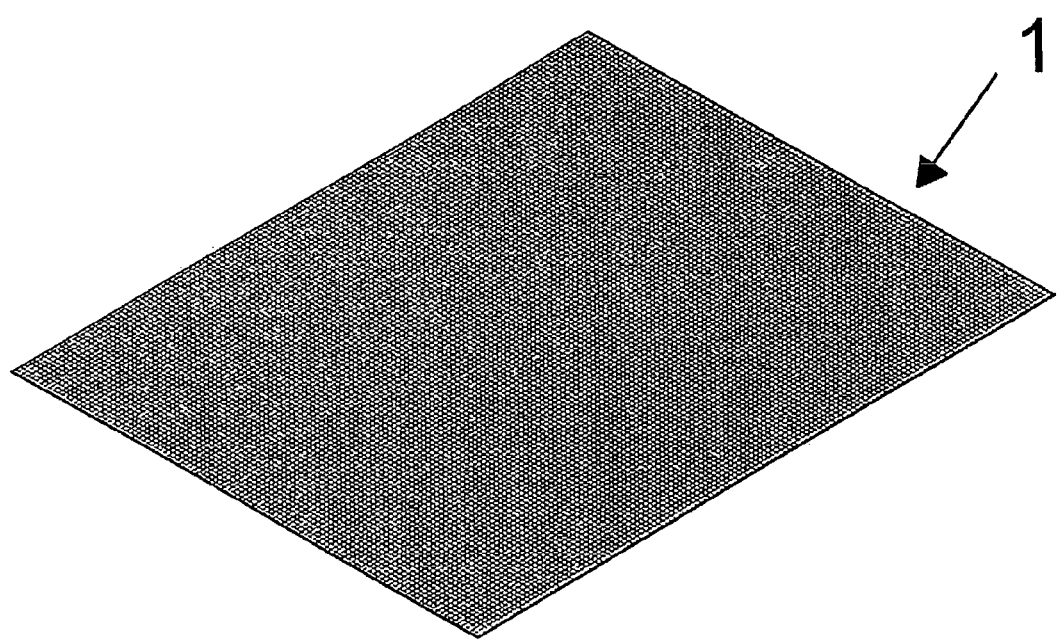
FIG. 4 is a further perspective view of a portion of a laminated textile construction according to the present invention.

FIG. 3 shows an application example of the laminar textile construction 1 on the back of an earpiece 6.

In this case the acoustic fabric should be desirably able of modifying the loudspeaker frequency response so as to amplify low frequencies which are very critical for small size loudspeakers.

Figure 5:
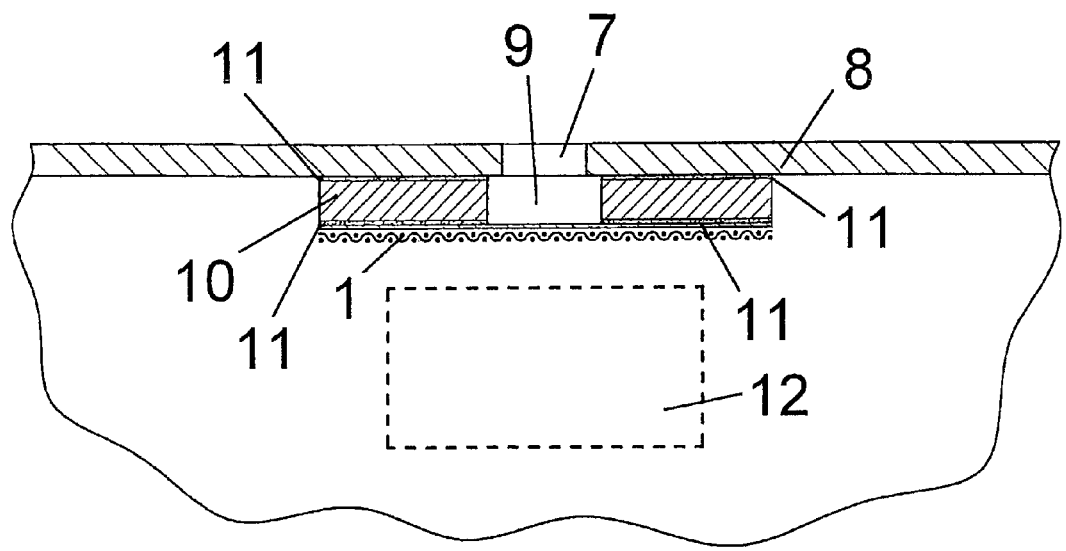
FIG. 5 is a schematic cross-sectional view showing an example of an acoustical filter made of a textile material assembled for protecting a microphone.

FIG. 5 shows the configuration of acoustical measurement test samples or specimens.

The present configuration simulates a typical diameter of holes 7 conventionally provided through the shell 8 of the cellular phone, of 3 mm, as well as the inner dimension 9 (of 4 mm) of the acoustic fabric portion 1, including the related gasket 10 and binding adhesive 11.

The dashed box 12 schematically shows an acoustic device, such as a microphone.

Figure 6:
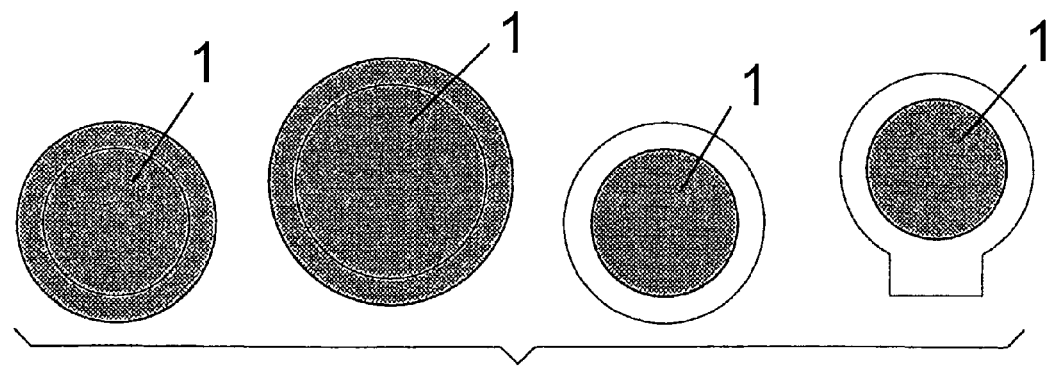
FIG. 6 shows some protective screens, made according to the present invention, to be assembled on microphones and loudspeakers of cellular phones.

FIG. 6 shows some examples of components made of a technical textile material with a protective function for the acoustic members, that is protective screens to be applied to cellular phones and microphones and loudspeakers.

The components have been made of the base textile product by a die-cutting method (or kiss-cutting technique), in association with other materials such as foamed silicone or acrylic resin gaskets and bi-adhesive ring elements.

The inner dimensions vary from 3 to 8 mm.

The laminar textile construction according to the present invention, accordingly, comprises a double layer made by coupling a technical synthetic single thread fabric material with a polymeric film, to be used as sub-components inside acoustic and electronic products or articles in general.

The subject textile construction may comprise moreover one or more layers provided with additional functions, such as aesthetic properties.

The laminar textile construction according to the present invention allows to make components having acoustic and/or protective functions, to be arranged inside the end acoustic products or articles.

In the most exemplary and non limitative case, said products are contoured or shaped products constituted by the subject laminar textile construction, together with gaskets and bi-adhesive film elements, die-cut according to a required configuration, according to the end acoustic article design.

The present invention allows to make fully functional subsets, such as, for example, speaker or microphone sub-assemblies, containing the above mentioned components coupled to optional other sub-components such as supports, acoustic channels or chambers, conventionally molded of a plastic material or made in any other suitable manner, optionally also including the acoustic member itself, such as the speaker or microphone.

Moreover, the inventive construction allows to make further components installed inside the acoustic article or product, different from those thereinabove disclosed, but however made based on the laminar textile construction according to the present invention.

For example, the subject laminar textile construction may be used as a starting material for forming microspeaker cones, or larger size speaker portions, such as cones, suspending assemblies, domes, centering elements, and so on.

The subject construction may be constituted by a technical synthetic PET, PA6.6, PA6, PP, PEN, PBT, PE or PEEK single-thread or multiple-thread fabric, of different structures.

The numbers of threads/cm, thread diameter, reinforcement structure, finishing arrangement may vary according to the requirements.

The subject construction may also be constituted by a continuous film made of PET, PA6.6, PA6, PP, PEN, PBT, PE, PI, PEI or PEEK, with thickness varying from a minimum technologically possible thickness, ideally zero, to a maximum of 50 microns.

The used materials also comprises all the currently existing polymers which may be machined or processed to provide a continuous film and/or a single-thread or multi-thread member suitable for weaving.

The used materials further comprise novel polymers technologically developed in a near future, provided that they are suitable or adapted to improve the applications according to the present invention.

The laminar textile construction according to the present invention may be preferably made by a hot-melt laminating method, by feeding PUR (reactive polyurethane) as a joining material for coupling the two layers.

Furthermore, the subject construction may also be made by other coupling methods, such as a hot laminating method with a feeding of a low-melting "mat", an ultrasound laminating method, an application of pressure sensitive adhesive materials and in general any other like methods providing a continuous coupling of two or more textile product layers, included all possible future developments related to technological advancements.

It has been found that the invention fully achieves the intended aim and objects.

In fact, water intrusion tests on the textile material according to the present invention have shown that it was possible to achieve a pressure corresponding to a water column of 10 meters, even corresponding to the IP68 index and not only to the IP67 index.

Moreover, real tests on samples assembled by the same method used for the end acoustic filter (a ring constituted by the laminated material+bi-adhesive strip+optional gasket) have shown real water intrusion pressure values varying from 2.5 to 10 meters of water column, in each case much greater than the minimum required value of 1 meter, necessary for an attribution of the IP67 index or characteristic.

With respect to the E-PTFE membranes, used as an actual reference for the status of the art or prior IP67 products, the novel inventive material provides the following remarkable advantages:

a reduction of the sound pressure level substantially similar to that of the membranes, but much more repeatable;

a much more flat frequency response, with a less distortion of the original sound signal;

a remarkably greater mechanical strength;

a greater stiffness, with a possibility of making larger size pieces;

an improved machinability and assembling facility;

a much more constant thickness.

To conclude, the construction according to the present invention allows to provide a true and perceptible improvement of the status of the art, referred to the is E-PTFE membranes, with respect to protective screen used as fittings in acoustic members of a number of audio and electronic large consume apparatus.

In practicing the invention, the used materials, as well as the size and shapes, can be any, depending on the requirements.

The invention claimed is:

1. A method of making laminar textile construction material for use in acoustic components, said method characterized by the positioning of a construction material comprising a double layer arrangement made by coupling a technical synthetic single-thread fabric surface to a polymeric film surface in an acoustic or electronic product, and that the coupling of said fabric surface and said film surface is made by a hot-melt laminating method comprising feeding a molten plastic resins, preferably a reactive polyurethane applied according to an interspaced joining spot pattern, with a spot density from 30 to 100 spots/cm$^2$, said single-thread fabric material has thread with a diameter varying from 24 to 120 microns, a number of threads/cm varying from 20 to 260, and a mesh opening varying from 20 to 250 microns.

2. A method according to claim 1, characterized in that said technical synthetic single-thread fabric comprises regular openings, of a square or rectangular configuration, of a synthetic single-thread and said polymeric film has a minimum thickness from about 2 microns to about 10 microns.

3. A method according to claim 1, characterized in that a top layer of said double-layer arrangement comprises a continuous film made of PET, PEN, PEEK or other polymers, with a thickness varying from 2 to 10 microns.

4. A method according to claim 1, characterized in that said material is made into rolls of different heights, from 80 to 220 cm, or in narrower strips of 15 mm, or being die-cut.

5. A method according to claim 1, characterized in that said material constitutes a portion of full functional sub-assemblies, such as speaker and microphone sub-assemblies, containing said components joined to optional other sub-components such as supports, acoustic channels or chambers, normally molded of a plastic material or made by other methods, optionally also including the acoustical member itself, such as speaker or microphone.

6. A method according to claim 1, characterized in that said material constitutes a part of acoustic products such as microspeaker cones, or larger-size speaker portions, such as cones, suspending members, domes and centering members.

7. A method according to claim 1, characterized in that said technical fabric is made of a variously constructed synthetic PET, PA, PP, PEN, PBT, PE or PEEK single-thread or multiple-thread, said polymeric film is continuous film being made of PET, PA, PP, PEN, PBT, PE, PI, PEI or PEEK, with a thickness varying from a minimum technological possible thickness, ideally zero, to a maximum thickness of 50 microns.

\* \* \* \* \*